(12) United States Patent
Li et al.

(10) Patent No.: US 10,657,841 B2
(45) Date of Patent: May 19, 2020

(54) EXPERIMENTAL SYSTEM AND METHOD FOR WHOLE-PROCESS SIMULATION OF SEEPAGE FAILURE IN FILLING-TYPE KARST MEDIA

(71) Applicant: SHANDONG UNIVERSITY, Jinan, Shandong (CN)

(72) Inventors: Shucai Li, Shandong (CN); Zhenhao Xu, Shandong (CN); Xintong Wang, Shandong (CN); Peng Lin, Shandong (CN); Xin Huang, Shandong (CN); Dongdong Pan, Shandong (CN); Wenyang Wang, Shandong (CN); Bin Gao, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 16/314,658

(22) PCT Filed: Dec. 14, 2017

(86) PCT No.: PCT/CN2017/116214
§ 371 (c)(1),
(2) Date: Dec. 31, 2018

(87) PCT Pub. No.: WO2019/095479
PCT Pub. Date: May 23, 2019

(65) Prior Publication Data
US 2019/0206279 A1     Jul. 4, 2019

(30) Foreign Application Priority Data
Nov. 17, 2017   (CN) .......................... 2017 1 11449395

(51) Int. Cl.
*G09B 25/08*   (2006.01)
*G09B 19/00*   (2006.01)
(Continued)

(52) U.S. Cl.
CPC ......... *G09B 19/0061* (2013.01); *G01N 13/04* (2013.01); *G01V 99/00* (2013.01); *G09B 25/06* (2013.01); *G09B 25/08* (2013.01)

(58) Field of Classification Search
CPC ...... G01V 99/00; G01V 99/005; G01N 13/04; G09B 25/06; G09B 25/08; G09B 19/0061
See application file for complete search history.

(56) References Cited

U.S. PATENT DOCUMENTS

2016/0047724 A1* 2/2016 Jeong ....................... G01N 3/24
                                                          73/784

FOREIGN PATENT DOCUMENTS

| CN | 104807960 A | 7/2015 |
| CN | 107144470 A | 9/2017 |
| CN | 107238482 A | 10/2017 |

OTHER PUBLICATIONS

Jun. 26, 2018 Office Action issued in Chinese Patent Application No. 201711144939.5.
(Continued)

*Primary Examiner* — Bruk A Gebremichael
(74) *Attorney, Agent, or Firm* — Oliff PLC

(57) ABSTRACT

A whole-process simulation experiment system has: a visualized model system with test samples and serving as a bearing device for the simulation of whole-process seepage of filling-type karst; a controllable support system supporting a visualized model box and controlling fluid seepage direction in the box by changing its inclination angle; a servo loading system controlling water pressure in the test process and providing four different loading modes for the box; a high-speed camera system recording water flow and particle motion in a transparent seepage model box in the seepage failure process; a comprehensive data measuring system monitoring and recording the change rules of factors including but not limited to seepage pressure, seepage amount and
(Continued)

sand gushing amount in the seepage failure process; and an information analysis and feedback system recording and analyzing the seepage process and the whole seepage failure process in real time to achieve data processing and feedback.

12 Claims, 3 Drawing Sheets

(51) Int. Cl.
*G09B 25/06* (2006.01)
*G01V 99/00* (2009.01)
*G01N 13/04* (2006.01)

(56) References Cited

OTHER PUBLICATIONS

Aug. 28, 2018 Written Opinion issued in International Patent Application No. PCT/CN2017/116214.
Sep. 5, 2018 Office Action issued in Chinese Patent Application No. 201711144939.5.

* cited by examiner

EXPERIMENTAL SYSTEM AND METHOD FOR WHOLE-PROCESS SIMULATION OF SEEPAGE FAILURE IN FILLING-TYPE KARST MEDIA

FIELD OF THE INVENTION

The present invention relates to an experimental system and method for whole-process simulation of seepage failure in filling-type karst media.

BACKGROUND OF THE INVENTION

Karst landforms are a type of landforms formed by dissolution, washout, subsurface erosion, collapse and the like of soluble rocks (carbonate, gypsum, rock salt, etc.) with water. The karst landforms are widely distributed around the world, China is the country with the largest karst area in the world, and the karst area in the southwest is as high as one third of the total area. Many cracks, pipelines and cavities are distributed in the rock masses of the karst landform zones. When underground works such as tunnels and foundation pits are constructed, the seepage failure is very likely to induce large-scale and sudden water inrush and mud flooding disasters, resulting in such problems such as personal casualties, construction delays, mechanical equipment damage and investment cost increase. Global scholars have carried out a series of researches on the simulation of a karst seepage process in respect of theoretical analysis, model tests, numerical simulations, etc., but at present, there is no experiment system for comprehensively monitoring the seepage failure of filling-type karst in different output states, and the conventional tests are not timely or accurate enough in monitoring the indicators of the whole process of seepage failure. Therefore, it is necessary to develop an experimental system and method for whole-process simulation of seepage failure in filling-type karst media.

SUMMARY OF THE INVENTION

In order to overcome the shortcomings of the above technologies, the present invention provides an experimental system and method for whole-process simulation of seepage failure in filling-type karst media, which integrate visualization and intelligent detection.

In order to achieve the above objectives, the present invention adopts the following technical solution:

A large-scale adjustable angle seepage failure experiment system for simulating whole-process seepage of filling-type karst comprises: a visualization model system loaded with test samples inside and serving as a bearing device to accomplish the simulation of whole-process seepage of filling-type karst;

a controllable support system for supporting the visualization model system and capable of controlling the seepage direction of fluid in a visualization model box by changing the inclination angle of the visualization model system;

a servo loading system for controlling water pressure in the test process and providing four different loading modes of constant flow, variable flow, constant pressure and variable pressure for the visualization model system;

a high-speed camera system for recording seepage failure in the visualization model system in the seepage failure process;

a comprehensive data measuring system for monitoring and recording the change rules of factors, including but not limited to seepage pressure, seepage amount and sand gushing amount in the seepage failure process; and an information analysis and feedback system for receiving radio signals emitted by the servo loading system, the high-speed camera system and the comprehensive data measuring system, and recording and analyzing the seepage process and the whole seepage failure process in real time to achieve data processing and feedback.

Through simulation tests on undisturbed fillings of the filling-type karst, the seepage failure features when the seepage failure of the undisturbed fillings occurs, as well as the change rules of hydraulic gradient, flow rate, water gushing amount and sand gushing amount over time in the process of occurrence, development and destruction of the seepage failure are studied.

Further, the visualization model system comprises a seepage model box, a water inlet pipe, a porous baffle, a multi-layer filter screen, a water conduit and an angle detector;

the seepage model box mentioned above has an opening at the water inlet end thereof, the opening is connected to the water inlet pipe, the porous baffle and the multi-layer filter screen are successively arranged on the water inlet side in the seepage direction, the porous baffle protects the filter screen to reduce high water pressure impact, the multi-layer filter screen may be composed of multiple layers of spaced PP cotton and stainless steel filter screens, the multi-layer filter screen alleviates uneven water pressure distribution in a water inlet segment and avoids non-uniform washout caused by large pressure, the water outlet end of the seepage model box is connected to the water conduit, and the outlet of the water conduit is in the shape of an inverted funnel; and the angle detector is used for detecting the inclination angle of the seepage model box.

Further, the controllable support system comprises fixing hinge supports, hydraulic telescopic rods and triangular hydraulic telescopic frames;

the fixing hinge supports comprise two types, namely inlet fixing hinges and outlet fixing hinges which are respectively fixed on the water inlet side and the water outlet side of the seepage model box, the inlet fixing hinges are connected with two sets of triangular hydraulic telescopic frames, the outlet fixing hinges are connected to a base through the hydraulic telescopic rods, and the triangular hydraulic telescopic frames and telescopic rods are controlled to realize 180° rotation of the seepage model box, thereby simulating the seepage failure of a filling medium under different output forms.

One set of triangular hydraulic telescopic frame is composed of three hydraulic telescopic rods, and is connected to the base through the fixing hinge supports;

Further, the servo loading system can provide four different loading modes, namely constant flow, variable flow, constant pressure and variable pressure modes, and is composed of a water tank and a loading device. Specifically, when the constant flow or variable flow mode is used, the loading device is a servo water pressure loader, and when the servo loading system uses the constant pressure or variable pressure mode, the loading device is composed of a pneumatic loading device and electrical control equipment. The loading device is provided with a display screen, a loading equation can be manually input by programming as needed, and the display screen displays a loading curve in real time.

Further, the high-speed camera system comprises a high-speed camera, a wireless transmission transceiver, an electric slide rail, an automatic lifting rod and a laser range finder, the electric slide rail is arranged on a test rack, the high-speed camera, the wireless transmission transceiver and the laser range finder are integrated in a shell and suspended on the electric slide rail through the automatic lifting rod to slide along the rod;

the wireless transmission transceiver communicates with the high-speed camera, the laser range finder and a central processing unit respectively, transmits images photographed by the high-speed camera to the central processing unit in real time, and transmits the distance between the camera and the model box measured by the laser range finder to the central processing unit, and the central processing unit adjusts the electric slide rail and the automatic lifting rod according to the measured distance to maintain a certain distance between the camera and the center of the seepage model box, and automatically rotates and adjusts the high-speed camera to keep the lens parallel to the surface of a seepage container. Generally, the distance between the camera and the model box is maintained to be about 30-50 cm. A large number of seepage failure images photographed by the camera system are input to a computer to acquire seepage feature image data when the seepage failure occurs and establish a seepage failure image feature library. During the test, the images photographed in real time are compared with the feature library. When the features are similar, the key seepage instability part is automatically focused and positioned for centralized high-definition shooting.

Further, the comprehensive data measuring system comprises a seepage pressure sensor, a flow recorder, a pressure recorder, water collectors, an automatic weighing measuring instrument and a screening drying device;

the seepage pressure sensor is embedded in an undisturbed soil sample, the flow recorder and the pressure recorder are fixed on the water inlet pipe to reduce the measurement error caused by uneven pressure of the servo loading system, and the seepage pressure, flow and water pressure changes during the test can be transmitted to the central processing unit in real time;

the water collectors are used for collecting water and solid particles taken out by the seepage failure, the plurality of water collectors are arranged closely on a conveyor belt, and triangular drainage boards are placed among the water collectors to reduce the dissipation of mud water along the edges of the water collectors during the movement of the conveyor belt; the automatic weighing measuring instrument records the weight $P_1$ of the mud water mixture to calculate a mud water seepage flow $Q^*$; the screening drying device performs standing separation, screening drying and weighing on the water collectors that have completed the mud water collection to obtain a solid weight $P_2$, and a corrected pure water seepage flow Q is further obtained;

$$Q^* = P_1/\rho_w t$$

$$Q = (P_1 - P_2)\rho_w t$$

wherein $\rho_w$ is the density of water, t is the time for weighing.

Specifically, weighing reset is performed before the test; during the test, the mud water first falls into the water collector I, the conveyor belt moves the distance of one water collector forward within a specified time, water collectors are manually replenished at the rear end of the conveyor belt such that the mud water sequentially falls into the water collectors II, III and IV, the automatic weighing measuring instrument records an effluent mud gushing weight $P_1$, then the mud water in each water collector is screened and dried, and the data can be automatically converted into flow data $Q^*$ according to the setting and displayed on the display screen of the central processing unit in real time by wireless transmission;

during the test process, the water collectors that have completed the mud water collection are stood and separated at regular intervals, screened, dried and weighed to obtain a solid weight $P_2$, and a corrected seepage flow Q is further obtained;

the information analysis feedback system comprises a central processing unit and a display, the central processing unit receives signals of the high-speed camera and the laser range finder and processes and analyzes data in real time, and the display displays the whole process of seepage failure for observation.

A method for simulating the whole process of seepage failure of filling-type karst by using the above device includes the following steps:

1) preparing an undisturbed soil sample of the filling-type karst in advance and embedding the seepage pressure sensor therein;

2) putting the sample into the seepage model box, sequentially arranging the multi-layer filter screen and the porous baffle at the water inlet end, connecting one end of a hose to the opening of the water inlet end of the model box, connecting the other end to the servo loading system, fixing the flow recorder and the pressure recorder to the hose, connecting the water outlet end of the seepage model box to the water conduit, and placing the water collectors, the conveyor belts and the automatic weighing measuring instrument;

3) adjusting the inclination angle of the seepage model box through the hydraulic telescopic frames and the telescopic rods according to the simulated output state, adjusting the position and angle of the high-speed camera according to the inclination angle, and starting the central processing unit and the display;

4) increasing the water pressure step by step while keeping the direction of seepage unchanged, observing the whole process through the display screen, and measuring and recording the whole process of seepage failure;

5) obtaining the changes of a variety of physical information in the whole seepage failure process through the monitored seepage pressure, flow, water pressure, seepage flow and sand gushing amount as well as the seepage features recorded by the camera system, studying the seepage rate and seepage failure features of undisturbed fillings when the seepage failure occurs as well as the laws of changes of hydraulic gradient and flow rate over time during the occurrence, development and destruction of the seepage failure, and studying the mechanism of seepage failure; and 6) repeating the test according to the specific needs by changing any one or more conditions of seepage direction, water pressure, undisturbed filling gradation and density, etc.

The present invention studied an experimental system and method for whole-process simulation of seepage failure in filling-type karst media, which overcome the shortcoming that the seepage angle cannot be adjusted in the past practice, and solve the technical problem of lack of comprehensive monitoring on the seepage failure process. Compared with previous studies, the device of the present invention has the following advantages:

1. The model box of the system, which is made of a high-strength transparent resin material, can be used for observing and shooting the test process, thereby realizing the visualization of the seepage failure process, and observing the process of formation of seepage channels more clearly and intuitively;

2. A set of controllable support system is designed for the system, so that the inclination angle can be flexibly changed according to the specific test requirements to realize 180° rotation and complete the simulation of seepage failure of a water-bearing structure at different angles in specific seepage directions;

3. The high-speed camera system records the seepage failure process and records image data for the seepage process. Through the mobile devices such as the slide rail, the lifting rod and the laser range finder, the three-dimensional adjustment and precise positioning of the high-speed camera are realized, and the distance between the camera and the center of the seepage model box is ensured;

4. The system can be programmed as needed to input a loading curve, and four different loading modes of constant flow, variable flow, constant pressure and variable pressure are respectively realized by loading water pressure and air pressure so as to provide different hydraulic conditions to fully meet the test requirements;

5. The comprehensive data measuring system proposed by the present invention includes a conveyor belt, water collectors, an automatic weighing measuring instrument, etc., which can integrate the functions of transmission, collection, measurement and screening and automatically correct the seepage flow;

6. The present invention can comprehensively monitor data changes during the test, including changes in seepage pressure, flow rate and water pressure, and complete real-time feedback and recording through wireless transmission and computer processing analysis.

BRIEF DESCRIPTION OF THE DRAWINGS

The accompanying drawings constituting a part of the present application are used for providing a further understanding on the present application, and the schematic embodiments of the present application and the description thereof are used for interpreting the present application, rather than constituting improper limitation to the present application.

Reference signs: 1, seepage model box; 2, water inlet pipe; 3, water conduit; 4, fixing hinge support; 5, hydraulic telescopic rod; 6, triangular hydraulic telescopic frame; 7, fixing hinge support; 8, base; 9, loading device; 10, water tank; 11, high-speed camera; 12, electric slide rail; 13, steel frame; 14, flow recorder; 15, pressure recorder; 16, water collector; 17, triangular drainage board; 18, conveyor belt; 19, automatic weighing measuring instrument; 20, central processing unit; 21, display;

1-1, multi-layer filter screen; 1-2, porous baffle; 1-3 seepage pressure sensor; 1-4 undisturbed filling; 1-5 angle detector, 11-1 wireless transmission transceiver; 11-2 laser range finder; 11-3 automatic lifting rod.

DETAILED DESCRIPTION OF EMBODIMENTS

It should be pointed out that the following detailed descriptions are all exemplary and aim to further illustrate the present application. Unless otherwise specified, all technical and scientific terms used in the descriptions have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly pointed out by the context, the singular form is also intended to include the plural form. In addition, it should also be understood that when the terms "include" and/or "comprise" are used in the specification, they indicate features, steps, operations, devices, components and/or their combination.

As described in the background, there are few model tests for comprehensive monitoring on seepage failure of filling-type karst, the seepage failure has not yet been studied under variable angle conditions, and the monitoring on various indicators of the water gushing disaster process is not timely or accurate. Therefore, it is necessary to develop an adjustable angle test system and operating method for whole-process simulation monitoring of seepage failure for the filling-type karst.

Figure 1:
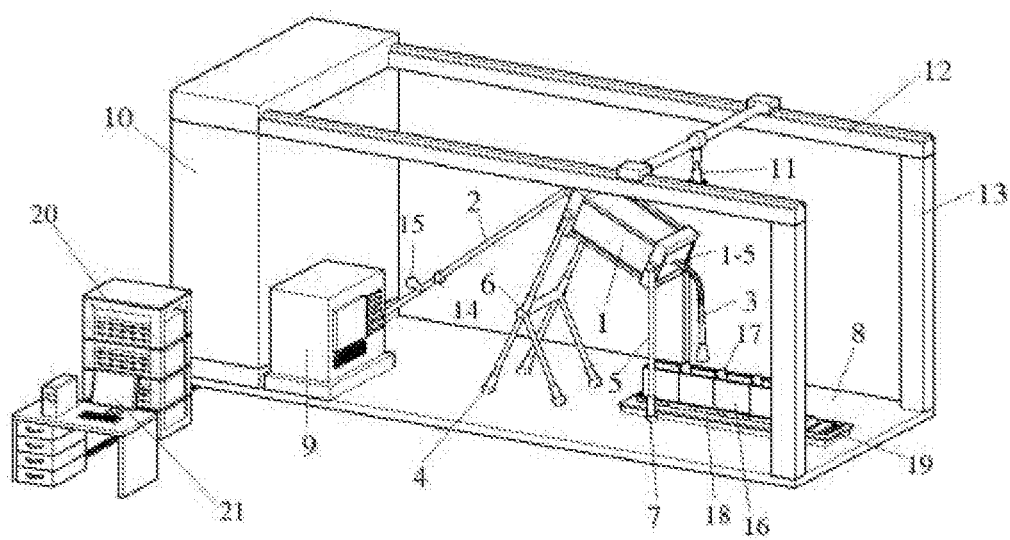
FIG. 1 is a three-dimensional view of a structure according to the present invention.

In a typical embodiment of the present application, as shown in FIG. 1, an experimental system and method for whole-process simulation of seepage failure in filling-type karst media is provided.

Figure 2:
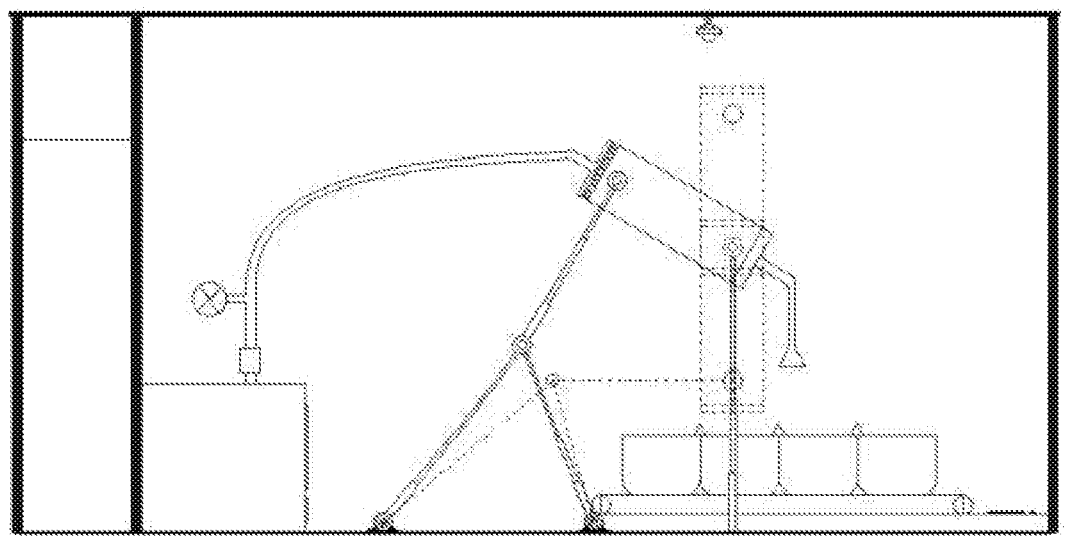
FIG. 2 is a two-dimensional front view of a structure according to the present invention.
Figure 3:
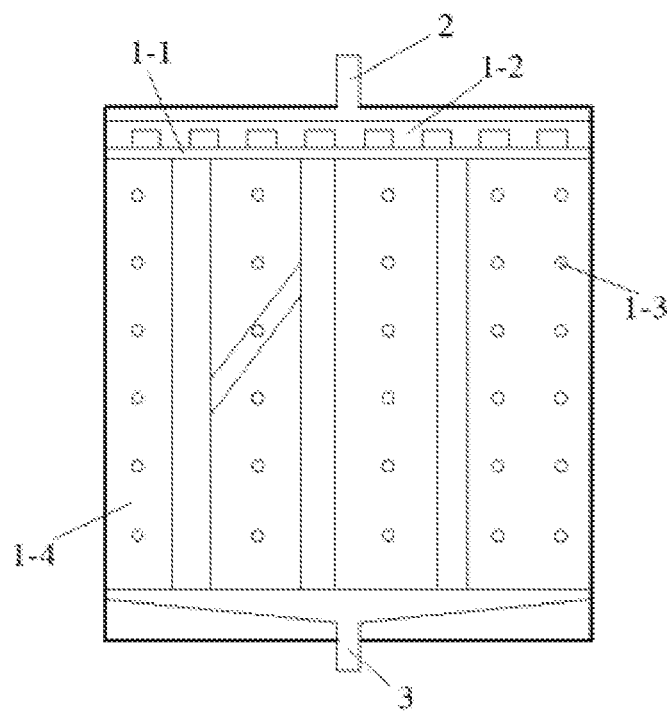
FIG. 3 is a schematic view of a detailed structure of a model box.
Figure 4:
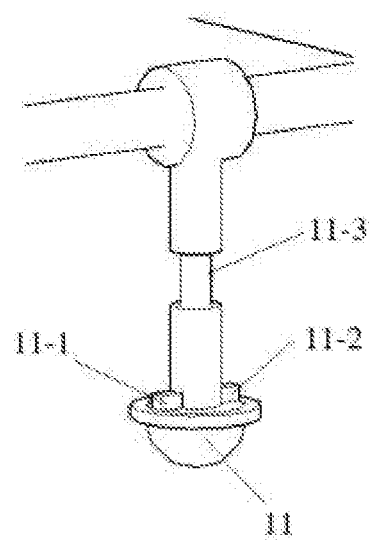
FIG. 4 is a schematic view of a detailed structure of a high-speed camera system.

As shown in FIGS. 1, 2 and 3, a large-scale adjustable angle seepage failure experiment system for simulating whole-process seepage of filling-type karst according to the present invention includes the following structures on the whole:

a visualization model system loaded with test samples and serving as a bearing device to accomplish the simulation of whole-process seepage of filling-type karst;

a controllable support system for supporting a seepage model box and capable of controlling the seepage direction by changing the inclination angle;

a servo loading system for controlling water pressure in the test process and providing four different loading modes of constant flow, variable flow, constant pressure and variable pressure;

a high-speed camera system for recording water flow and particle motion in the transparent seepage model box in the seepage failure process;

a comprehensive data measuring system for monitoring and recording the change rules of seepage pressure, seepage amount, sand gushing amount and other factors in the seepage failure process; and an information analysis feedback system, including a transmission line, a central processing unit and a display, for receiving radio signals emitted by the servo loading system, the high-speed camera system and the comprehensive data measuring system, and recording and analyzing the seepage process and the whole seepage failure process in real time to achieve data processing and feedback.

The visualization model box system in the present invention includes a seepage model box 1, a water inlet pipe 2, a porous baffle 1-2, an angle detector 1-5, a multi-layer filter screen 1-1 and a water conduit 3.

The seepage model box 1 is made of a high-strength transparent resin material, has a length of 0.5 m, a width of 0.5 m and a height of 0.3 m, and has an opening at a water inlet end thereof, the opening is connected to the water inlet pipe 2, and the porous baffle 1-2 and the multi-layer filter screen 1-1 are successively arranged in the water flow direction. The porous baffle 1-2 protects the filter screen to reduce high water pressure impact, and the multi-layer filter screen alleviates uneven water pressure distribution in a water inlet segment to avoid forming large pressure during water ingress so as to avoid non-uniform washout on a seepage medium. The water outlet end of the seepage model box 1 is connected to the water conduit 3, and the outlet of the water conduit 3 is in the shape of an inverted funnel. The angle detector 1-5 is located at the joint of a hydraulic telescopic rod and the model box and used for detecting the inclination angle of the model box.

Specifically, the distribution pattern of the porous baffle 1-2 and the multi-layer filter screen 1-1 is:

The porous baffle 1-2 is arranged close to the inner side of the side wall of the water inlet side of the box body, then the multi-layer filter screen 1-1 is arranged adjacent to the multi-layer baffle, and undisturbed fillings 1-4 are placed in the space formed by the multi-layer filter screen 1-1 and other side walls of the box body; and a seepage pressure sensor 1-3 is embedded in the undisturbed fillings.

The controllable support system in the present invention includes fixing hinge supports 4, hydraulic telescopic rods 5, triangular hydraulic telescopic frames 6 and a fixing hinge support 7; the eight fixing hinge supports 4 are located at the inlet end of the seepage model box 1, four of them correspond to a set of triangular hydraulic telescopic frame, one set of triangular hydraulic telescopic frame is composed of three hydraulic telescopic rods, two hydraulic telescopic rods of them are connected to a base of a test rack through two inlet fixing hinges, the output ends of the two hydraulic telescopic rods are connected to the third hydraulic telescopic rod through an inlet fixing hinge, and the output end of the third hydraulic telescopic rod is connected to the model box; and the two sets of triangular hydraulic telescopic frames are connected by a connecting rod to realize synchronous movement.

Four fixing hinge supports 7 are provided, one is arranged on each of two sides of the outlet end of the seepage model box 1, and the other two are arranged on the base opposite to the two fixing hinge supports. The upper and lower opposite fixing hinge supports 7 are connected by hydraulic telescopic rods. The triangular hydraulic telescopic frames and the hydraulic telescopic rods are controlled to realize 180° rotation of the seepage model box, thereby simulating the seepage failure of a filling medium in different seepage directions under different output forms.

The servo loading system in the present invention is composed of a water tank and a loading device, and can provide four different loading modes of constant flow, variable flow, constant pressure and variable pressure; specifically, when the flow mode is used, the loading device is a servo water pressure loader; and when the pressure mode is used, the loading device is composed of a pneumatic loading device and electrical control equipment. The loading device is equipped with a display screen, a loading equation can be manually input by programming as needed, and the display screen displays a loading curve in real time.

The high-speed camera system in the present invention includes a high-speed camera 11, a wireless transmission transceiver 11-1, an electric slide rail 12, a steel frame 13, an automatic lifting rod 11-3 and a laser range finder 11-2, wherein the steel frame 13 is a rectangular frame. The electric slide rail is arranged on the steel frame 13; the high-speed camera 11, the wireless transmission transceiver 11-1 and the laser range finder 11-2 are integrated in a shell and suspended on the electric slide rail through the automatic lifting rod 11-3; the movement of the high-speed camera in the X-axis and Y-axis directions can be realized by controlling the movement of the electric slide rail and the sliding of the automatic lifting rod, the movement of the high-speed camera in the Z-axis direction can be realized by controlling the lifting of the automatic lifting rod, and then the positions of the high-speed camera, the wireless transmission transceiver and the laser range finder are adjusted.

The wireless transmission transceiver 11-1 can transmit the photographed images to the central processing unit in real time, the laser range finder measures the distance from the camera to the model box and transmits the same to the central processing unit to adjust the electric slide rail and the automatic lifting rod, the distance between the camera and the center of the seepage model box is maintained to be 30-50 cm, and the high-speed camera is automatically rotated and adjusted to keep the lens parallel to the surface of a seepage container.

The comprehensive data measuring system includes a seepage pressure sensor 1-3, a flow recorder 14, a pressure recorder 15, water collectors 16, an automatic weighing measuring instrument 19 and a screening drying device.

Figure 5:
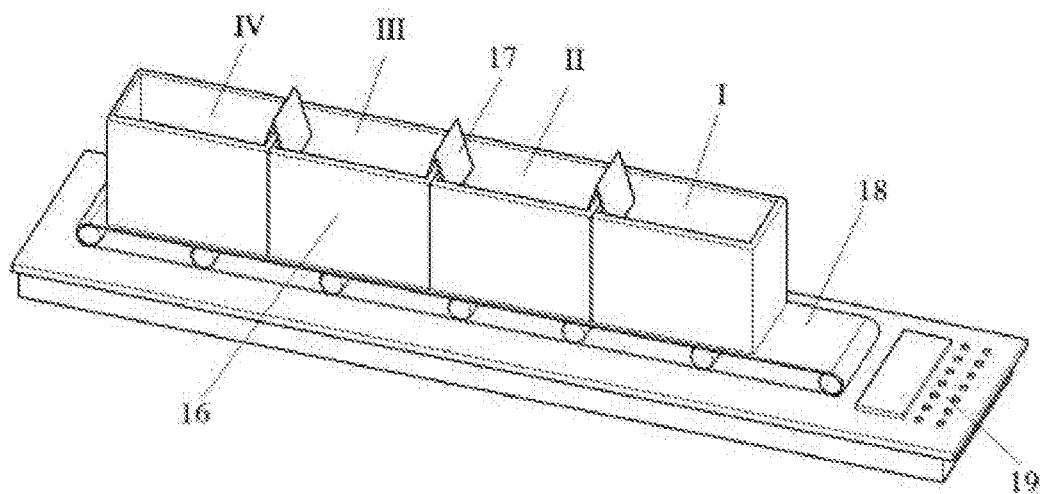
FIG. 5 is a schematic view of a detailed structure of a weighing device.

The seepage pressure sensor 1-3 is embedded in an undisturbed soil sample, the flow recorder 14 and the pressure recorder 15 are fixed on the water inlet pipe 2 to reduce the measurement error caused by uneven loading of the servo loading system, and the seepage pressure, flow and water pressure changes during the test can be transmitted to the central processing unit in real time. As shown in FIG. 5, the water collectors are cubes and are used for collecting water and solid particles taken out by seepage failure, a plurality of water collectors are arranged closely on the conveyor belt 18, triangular drainage boards 17 are placed between the water collectors to reduce the dissipation of mud water along the edges of the water collectors during the movement of the conveyor belt 18, and weighing reset is performed before the test. During the test, the mud water first falls into the water collector I, the conveyor belt 18 moves the distance of one water collector forward within a specified time, water collectors are manually replenished at the rear end of the conveyor belt such that the mud water sequentially falls into the water collectors II, III and IV, the automatic weighing measuring instrument records an effluent mud gushing weight $P_1$, then the mud water in the water collector I is screened and dried, and the data can be automatically converted into flow data $Q^*$ according to the setting and displayed on the display screen of the central processing unit in real time by wireless transmission.

During the test process, the water collectors that have completed the mud water collection are stood and separated at regular intervals, screened, dried and weighed to obtain a solid weight $P_2$, and a corrected seepage flow Q is further obtained;

$$Q^* = P_1/\rho_w t$$

$$Q = (P_1 - P_2)/\rho_w t$$

wherein $\rho_w$ is the density of water, t is the time for weighing.

The information analysis feedback system includes a transmission line, a central processing unit 20 and a display 21, the central processing unit receives signals and processes and analyzes data in real time, and the display displays and feeds back the seepage process and the whole seepage failure process.

The specific test process is as follows:

Before the test, a sample 1-4 is prepared according to the undisturbed fillings of filling-type karst, and the seepage pressure sensor 1-3 is buried therein. Then, the sample is put into the seepage model box 1, the multi-layer filter screen 1-1 and the porous baffle 1-2 are successively arranged at the water inlet end, the water inlet end of the model box is connected to the hose 2, the flow recorder 14 and the pressure recorder 15 are fixed to the hose, the other end of the hose is connected to the servo loading system 9, the water outlet end of the seepage model box is connected to the water conduit 3, the plurality of water collectors 16 are closely arranged on the conveyor belt 18, the triangular drainage boards 17 are placed between the water collectors, and the automatic weighing measuring instrument 19 is placed. The inclination angle of the seepage model box is adjusted through the hydraulic telescopic rods 5 and the triangular hydraulic telescopic frames 6 according to the preset seepage direction, the electric slide rail 12 and the automatic lifting rod 11-3 are adjusted, the distance between the camera 11 and the center of the seepage model box 1 is maintained to 0.3-0.5 m, and the high-speed camera is automatically rotated and adjusted to implement focusing and keep the lens parallel to the surface of the seepage container. Subsequently, the central processing unit 20 and the display 21 are started, and weighing reset is performed before the test. During the test, the direction of seepage is kept constant, the servo loading system 9 is adjusted, the water pressure is applied, the whole process is observed through the display screen, and the whole process of seepage failure is measured and recorded. During the test, the images photographed in real time are compared with the seepage failure image feature library. When the features are similar, the key seepage instability part is automatically focused and positioned for centralized high-definition shooting. As the test progresses, the mud water first falls into the water collector I, the conveyor belt moves the distance of one water collector forward within a specified time, water collectors are manually replenished at the rear end of the conveyor belt such that the mud water sequentially falls into the water collectors II, III and IV, the automatic weighing measuring instrument records an effluent mud gushing weight, then the mud water in the water collector I is screened and dried, the data can be processed by the computer according to the program, and the flow data is automatically converted, corrected and displayed on the display screen of the central processing unit in real time by wireless transmission.

The test can be repeated according to the specific needs by changing any one or more conditions of seepage direction, water pressure, undisturbed filling gradation and density, etc.

Although the specific embodiments of the present invention are described above in combination with the accompanying drawings, the protection scope of the present invention is not limited thereto. It should be understood by those skilled in the art that various modifications or variations could be made by those skilled in the art based on the technical solution of the present invention without any creative effort, and these modifications or variations are also encompassed within the protection scope of the present invention.

The invention claimed is:

1. An adjustable angle experimental system for whole-process simulation of seepage failure in filling-type karst media, comprising:
a visualized model system loaded with test samples and serving as a bearing device to accomplish the simulation of whole-process seepage of filling-type karst; wherein the visualized model system comprises a seepage model box and a water inlet pipe; the seepage model box has an opening at each of a water outlet end and a water inlet end thereof, the water inlet end is connected to the water inlet pipe;
a controllable support system for supporting the visualized model system and capable of controlling the seepage direction of fluid in the seepage model box by changing the inclination angle of the seepage model box; the controllable support system comprises fixing hinge supports, hydraulic telescopic rods and triangular hydraulic telescopic frames;
the fixing hinge supports comprise inlet fixing hinges and outlet fixing hinges which are respectively fixed on the water inlet side and the water outlet side of the seepage model box; the inlet fixing hinges are connected with two sets of triangular hydraulic telescopic frames; the outlet fixing hinges are connected to a base through the hydraulic telescopic rods; and the triangular hydraulic telescopic frames and telescopic rods are controlled to realize 180° rotation of the seepage model box, thereby simulating the seepage failure of a filling medium under different output forms;
a servo loading system for controlling water pressure in the test process and providing four different loading modes of constant flow, variable flow, constant pressure and variable pressure for the visualized model system;
a high-speed camera system for recording seepage failure in the visualized model system in the seepage failure process; the high-speed camera system comprises a high-speed camera, a wireless transmission transceiver, an electric slide rail, an automatic lifting rod and a laser range finder; the electric slide rail is arranged on a test rack; the high-speed camera, the wireless transmission transceiver and the laser range finder are integrated in a shell and suspended on the electric slide rail through the automatic lifting rod;
the wireless transmission transceiver communicates with the high-speed camera, the laser range finder and a central processing unit respectively; the wireless transmission transceiver (a) transmits images photographed by the high-speed camera to the central processing unit in real time, and (b) transmits the distance between the camera and the seepage model box measured by the laser range finder to the central processing unit; and the central processing unit (a) adjusts the electric slide rail and the automatic lifting rod according to the measured distance to maintain a certain distance between the camera and the center of the seepage model box, and (b) automatically rotates and adjusts the high-speed camera to keep lens of said camera parallel to the surface of a seepage container;
a comprehensive data measuring system for monitoring and recording change in factors including seepage pressure, seepage amount and sand gushing amount in the seepage failure process; the comprehensive data measuring system comprises a seepage pressure sensor, a flow recorder, a pressure recorder, a plurality of water collectors, an automatic weighing measuring instrument and a screening drying device;
the seepage pressure sensor is embedded in an undisturbed soil sample; the flow recorder and the pressure recorder are fixed on the water inlet pipe to reduce measurement error caused by uneven loading of the servo loading system; and the seepage pressure, flow and water pressure changes during the test are transmitted to the central processing unit in real time; the water collectors are used for collecting water and solid particles taken out by the seepage failure; and the automatic weighing measuring instrument records an effluent mud gushing weight $P_1$; the screening drying device performs standing separation, screening drying and weighing on the water collectors that have completed the mud water collection to obtain a solid weight $P_2$; and a corrected seepage flow Q is further obtained, where:

$$Q^* = P_1/\rho_w t$$

$$Q = (P_1 - P_2)/\rho_w t$$

wherein $Q^*$ is flow data, $\rho_w$ is the density of water and t is the time for weighing; and an information analysis and feedback system for (a) receiving radio signals emitted by the servo loading system, the high-speed camera system and the comprehensive data measuring system, and (b) recording and analyzing the seepage process and the whole seepage failure process in real time to achieve data processing and feedback.

2. The experimental system for whole-process simulation of seepage failure in filling-type karst media according to claim 1, wherein the visualized model system further comprises a porous baffle, an angle detector, a multi-layer filter screen and a water conduit;

the porous baffle and the multi-layer filter screen are successively arranged on the water inlet side of the seepage model box in the water seepage direction; and the water outlet end of the seepage model box is connected to the water conduit; and the angle detector is used for detecting the inclination angle of the seepage model box.

3. The experimental system for whole-process simulation of seepage failure in filling-type karst media according to claim 2, wherein the outlet of the water conduit is in the shape of an inverted funnel.

4. The experimental system for whole-process simulation of seepage failure in filling-type karst media according to claim 1, wherein the servo loading system is composed of a water tank and a loading device;

the loading device provides four different loading modes of constant flow, variable flow, constant pressure and variable pressure;

when the constant flow or variable flow mode is used, the loading device is a servo water pressure loader;

when the constant pressure or variable pressure mode is used, the loading device is composed of a pneumatic loading device and electrical control equipment;

the loading device is provided with a display screen, a loading equation is manually inputted by programming; and the display screen displays a loading curve in real time.

5. The experimental system for whole-process simulation of seepage failure in filling-type karst media according to claim 1, wherein the plurality of water collectors are closely arranged on a conveyor belt, and triangular drainage boards are placed between the water collectors.

6. The experimental system for whole-process simulation of seepage failure in filling-type karst media according to claim 1, wherein the information analysis feedback system comprises said central processing unit and a display; and the display displays feedback regarding the seepage process and the whole seepage failure process.

7. A method for simulating whole-process seepage and seepage failure of filling-type karst by using the experimental system for whole-process simulation of seepage failure in filling-type karst media according to claim 1, comprising the following steps:

1) preparing a sample of undisturbed fillings and graded soil of the filling-type karst; and embedding the seepage pressure sensor therein;

2) putting the sample into the seepage model box; sequentially arranging a multi-later filter screen and a porous baffle at the water inlet end; fixing a hose to the opening of the water inlet end of the seepage model box; connecting the other end of the hose to the servo loading system; connecting the water outlet end of the seepage model box to a water conduit; fixing the flow recorder and the pressure recorder to the hose; and placing the water collectors, conveyor belts and the automatic weighing measuring instrument;

3) adjusting the inclination angle of the seepage model box through the hydraulic telescopic rods according to a preset seepage direction; adjusting the position and angle of the high-speed camera according to the inclination angle; and starting the central processing unit and the display;

4) increasing the water pressure step by step while keeping the direction of seepage unchanged; observing the whole process through the display screen; and measuring and recording the whole process of seepage failure;

5) obtaining the changes of a plurality of physical parameters in the whole seepage failure process through the monitored seepage pressure, flow, water pressure, seepage flow and sand gushing amount; studying the seepage rate and seepage failure features of undisturbed fillings when the seepage failure occurs as well as changes of hydraulic gradient and flow rate over time during the occurrence, development and destruction of the seepage failure; and studying the mechanism of seepage failure; and 6) repeating the test according to specific needs by changing any one or more conditions of seepage direction, water pressure, undisturbed filling gradation and density.

8. A method for simulating whole-process seepage and seepage failure of filling-type karst by using the experimental system for whole-process simulation of seepage failure in filling-type karst media according to claim 2, comprising the following steps:

1) preparing a sample of undisturbed fillings and graded soil of the filling-type karst; and embedding the seepage pressure sensor therein;

2) putting the sample into the seepage model box; sequentially arranging the multi-layer filter screen and the porous baffle at the water inlet end; fixing a hose to the opening of the water inlet end of the seepage model box; connecting the other end of the hose to the servo loading system; connecting the water outlet end of the seepage model box to the water conduit; fixing the flow recorder and the pressure recorder to the hose; and placing the water collectors, conveyor belts and the automatic weighing measuring instrument;

3) adjusting the inclination angle of the seepage model box through the hydraulic telescopic rods according to a preset seepage direction; adjusting the position and angle of the high-speed camera according to the inclination angle; and starting the central processing unit and the display;

4) increasing the water pressure step by step while keeping the direction of seepage unchanged; observing the whole process through the display screen; and measuring and recording the whole process of seepage failure;
5) obtaining the changes of a plurality of physical parameters in the whole seepage failure process through the monitored seepage pressure, flow, water pressure, seepage flow and sand gushing amount; studying the seepage rate and seepage failure features of undisturbed fillings when the seepage failure occurs as well as changes of hydraulic gradient and flow rate over time during the occurrence, development and destruction of the seepage failure; and studying the mechanism of seepage failure; and
6) repeating the test according to specific needs by changing any one or more conditions of seepage direction, water pressure, undisturbed filling gradation and density.

9. A method for simulating whole-process seepage and seepage failure of filling-type karst by using the experimental system for whole-process simulation of seepage failure in filling-type karst media according to claim 3, comprising the following steps:
1) preparing a sample of undisturbed fillings and graded soil of the filling-type karst; and embedding the seepage pressure sensor therein;
2) putting the sample into the seepage model box; sequentially arranging the multi-layer filter screen and the porous baffle at the water inlet end; fixing a hose to the opening of the water inlet end of the seepage model box; connecting the other end of the hose to the servo loading system; connecting the water outlet end of the seepage model box to the water conduit; fixing the flow recorder and the pressure recorder to the hose; and placing the water collectors, conveyor belts and the automatic weighing measuring instrument;
3) adjusting the inclination angle of the seepage model box through the hydraulic telescopic rods according to a preset seepage direction; adjusting the position and angle of the high-speed camera according to the inclination angle; and starting the central processing unit and the display;
4) increasing the water pressure step by step while keeping the direction of seepage unchanged; observing the whole process through the display screen; and measuring and recording the whole process of seepage failure;
5) obtaining the changes of a plurality of physical parameters in the whole seepage failure process through the monitored seepage pressure, flow, water pressure, seepage flow and sand gushing amount; studying the seepage rate and seepage failure features of undisturbed fillings when the seepage failure occurs as well as changes of hydraulic gradient and flow rate over time during the occurrence, development and destruction of the seepage failure; and studying the mechanism of seepage failure; and
6) repeating the test according to specific needs by changing any one or more conditions of seepage direction, water pressure, undisturbed filling gradation and density.

10. A method for simulating whole-process seepage and seepage failure of filling-type karst by using the experimental system for whole-process simulation of seepage failure in filling-type karst media according to claim 4, comprising the following steps:
1) preparing a sample of undisturbed fillings and graded soil of the filling-type karst; and embedding the seepage pressure sensor therein;
2) putting the sample into the seepage model box; sequentially arranging a multi-layer filter screen and a porous baffle at the water inlet end; fixing a hose to the opening of the water inlet end of the seepage model box; connecting the other end of the hose to the servo loading system; connecting the water outlet end of the seepage model box to a water conduit; fixing the flow recorder and the pressure recorder to the hose; and placing the water collectors, conveyor belts and the automatic weighing measuring instrument;
3) adjusting the inclination angle of the seepage model box through the hydraulic telescopic rods according to a preset seepage direction; adjusting the position and angle of the high-speed camera according to the inclination angle; and starting the central processing unit and the display;
4) increasing the water pressure step by step while keeping the direction of seepage unchanged; observing the whole process through the display screen; and measuring and recording the whole process of seepage failure;
5) obtaining the changes of a plurality of physical parameters in the whole seepage failure process through the monitored seepage pressure, flow, water pressure, seepage flow and sand gushing amount; studying the seepage rate and seepage failure features of undisturbed fillings when the seepage failure occurs as well as changes of hydraulic gradient and flow rate over time during the occurrence, development and destruction of the seepage failure; and studying the mechanism of seepage failure; and
6) repeating the test according to specific needs by changing any one or more conditions of seepage direction, water pressure, undisturbed filling gradation and density.

11. A method for simulating whole-process seepage and seepage failure of filling-type karst by using the experimental system for whole-process simulation of seepage failure in filling-type karst media according to claim 5, comprising the following steps:
1) preparing a sample of undisturbed fillings and graded soil of the filling-type karst; and embedding the seepage pressure sensor therein;
2) putting the sample into the seepage model box; sequentially arranging a multi-layer filter screen and a porous baffle at the water inlet end; fixing a hose to the opening of the water inlet end of the seepage model box; connecting the other end of the hose to the servo loading system; connecting the water outlet end of the seepage model box to a water conduit; fixing the flow recorder and the pressure recorder to the hose; and placing the water collectors, conveyor belts and the automatic weighing measuring instrument;
3) adjusting the inclination angle of the seepage model box through the hydraulic telescopic rods according to a preset seepage direction; adjusting the position and angle of the high-speed camera according to the inclination angle; and starting the central processing unit and the display;
4) increasing the water pressure step by step while keeping the direction of seepage unchanged; observing the whole process through the display screen; and measuring and recording the whole process of seepage failure;
5) obtaining the changes of a plurality of physical parameters in the whole seepage failure process through the monitored seepage pressure, flow, water pressure, seepage flow and sand gushing amount; studying the seepage rate and seepage failure features of undisturbed fillings when the seepage failure occurs as well as changes of hydraulic gradient and flow rate over time during the occurrence, development and destruction of the seepage failure; and studying the mechanism of seepage failure; and 6) repeating the test according to specific needs by changing any one or more conditions of seepage direction, water pressure, undisturbed filling gradation and density.

12. A method for simulating whole-process seepage and seepage failure of filling-type karst by using the experimental system for whole-process simulation of seepage failure in filling-type karst media according to claim 6, comprising the following steps:

1) preparing a sample of undisturbed fillings and graded soil of the filling-type karst; and embedding the seepage pressure sensor therein;

2) putting the sample into the seepage model box; sequentially arranging a multi-layer filter screen and a porous baffle at the water inlet end; fixing a hose to the opening of the water inlet end of the seepage model box; connecting the other end of the hose to the servo loading system; connecting the water outlet end of the seepage model box to the water conduit; fixing the flow recorder and the pressure recorder to the hose; and placing the water collectors, conveyor belts and the automatic weighing measuring instrument;

3) adjusting the inclination angle of the seepage model box through the hydraulic telescopic rods according to a preset seepage direction; adjusting the position and angle of the high-speed camera according to the inclination angle; and starting the central processing unit and the display;

4) increasing the water pressure step by step while keeping the direction of seepage unchanged; observing the whole process through the display screen; and measuring and recording the whole process of seepage failure;

5) obtaining the changes of a plurality of physical parameters in the whole seepage failure process through the monitored seepage pressure, flow, water pressure, seepage flow and sand gushing amount; studying the seepage rate and seepage failure features of undisturbed fillings when the seepage failure occurs as well as changes of hydraulic gradient and flow rate over time during the occurrence, development and destruction of the seepage failure; and studying the mechanism of seepage failure; and 6) repeating the test according to specific needs by changing any one or more conditions of seepage direction, water pressure, undisturbed filling gradation and density.

* * * * *